United States Patent [19]
Keeney et al.

[11] 4,156,110
[45] May 22, 1979

[54] DATA VERIFIER

[75] Inventors: Clare G. Keeney, Campbell; Bruce L. Miller, Palo Alto; William C. Rea, II, Sunnyvale, all of Calif.

[73] Assignee: TRW Inc., Los Angeles, Calif.

[21] Appl. No.: 822,215

[22] Filed: Aug. 5, 1977

Related U.S. Application Data

[63] Continuation of Ser. No. 664,103, Mar. 5, 1976, abandoned.

[51] Int. Cl.² ............................................. H04J 3/14
[52] U.S. Cl. ............................................. 179/15 BF
[58] Field of Search ............... 179/15 BF, 175.2 R, 179/175.2 C, 8 R, 9, 7 R, 7.1 R, 7.1 TP

[56] References Cited
U.S. PATENT DOCUMENTS

| | | | |
|---|---|---|---|
| 3,062,918 | 11/1962 | Williford | 179/7 R |
| 3,499,994 | 3/1970 | Lord | 179/175.2 R |
| 3,683,115 | 8/1972 | Schellenberg | 179/15 BF |
| 3,745,561 | 7/1973 | van Dijk | 340/347 AD |
| 3,787,628 | 1/1974 | van Dijk | 179/15 BF |
| 3,892,923 | 7/1975 | Ranner | 179/15 BF |
| 3,959,594 | 5/1976 | Srivastava | 179/15 AL |
| 4,022,979 | 5/1977 | Smith | 179/15 BF |

Primary Examiner—David L. Stewart
Attorney, Agent, or Firm—Flehr, Hohbach, Test, Albritton & Herbert

[57] ABSTRACT

A data verifier for verifying the operation of a multiplexing system. The data verifier generates test information as an input to the multiplexing system. The multiplexing system processes the test information in the same manner as normal data. The data verifier then detects demultiplexed output information and compares it with reference information to determine if the multiplex system has functioned properly. The multiplex system is typically a metering system for metering the use of trunk lines of a telephone switching exchange.

15 Claims, 6 Drawing Figures

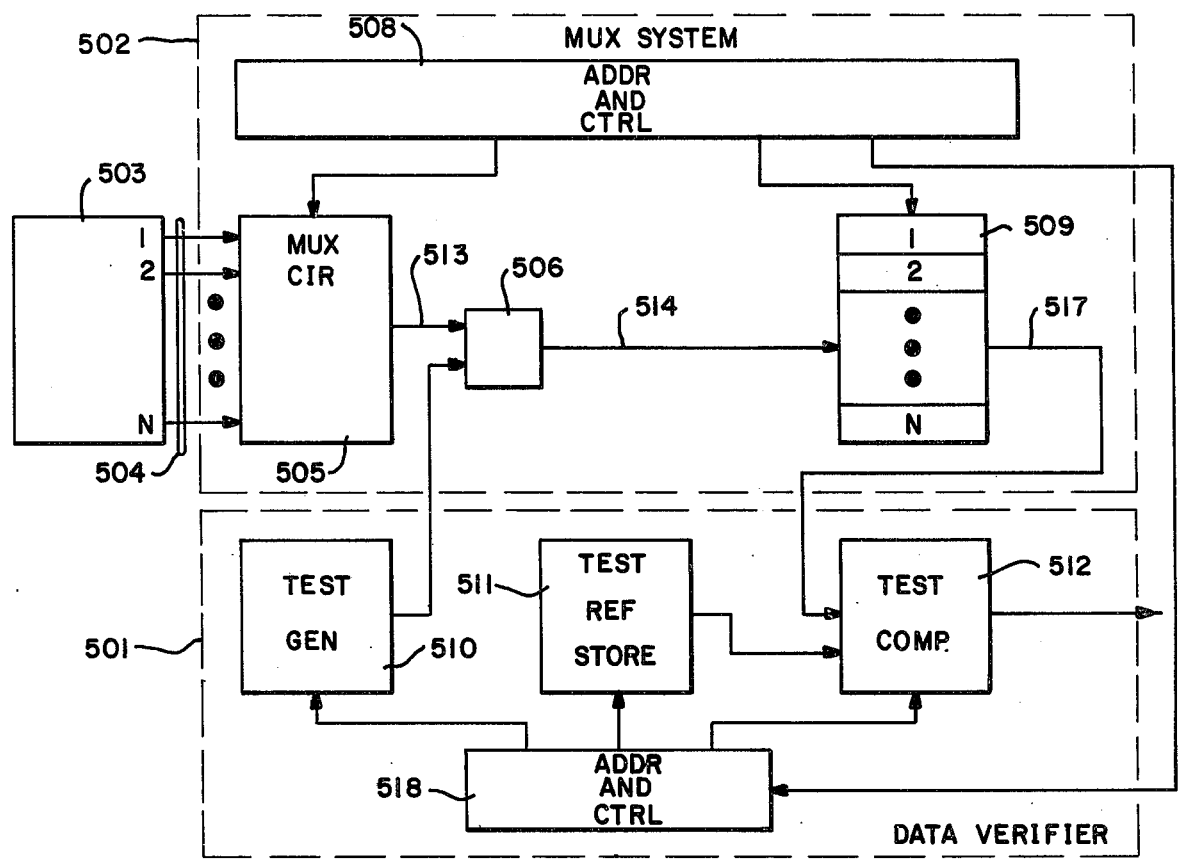
FIG.—1

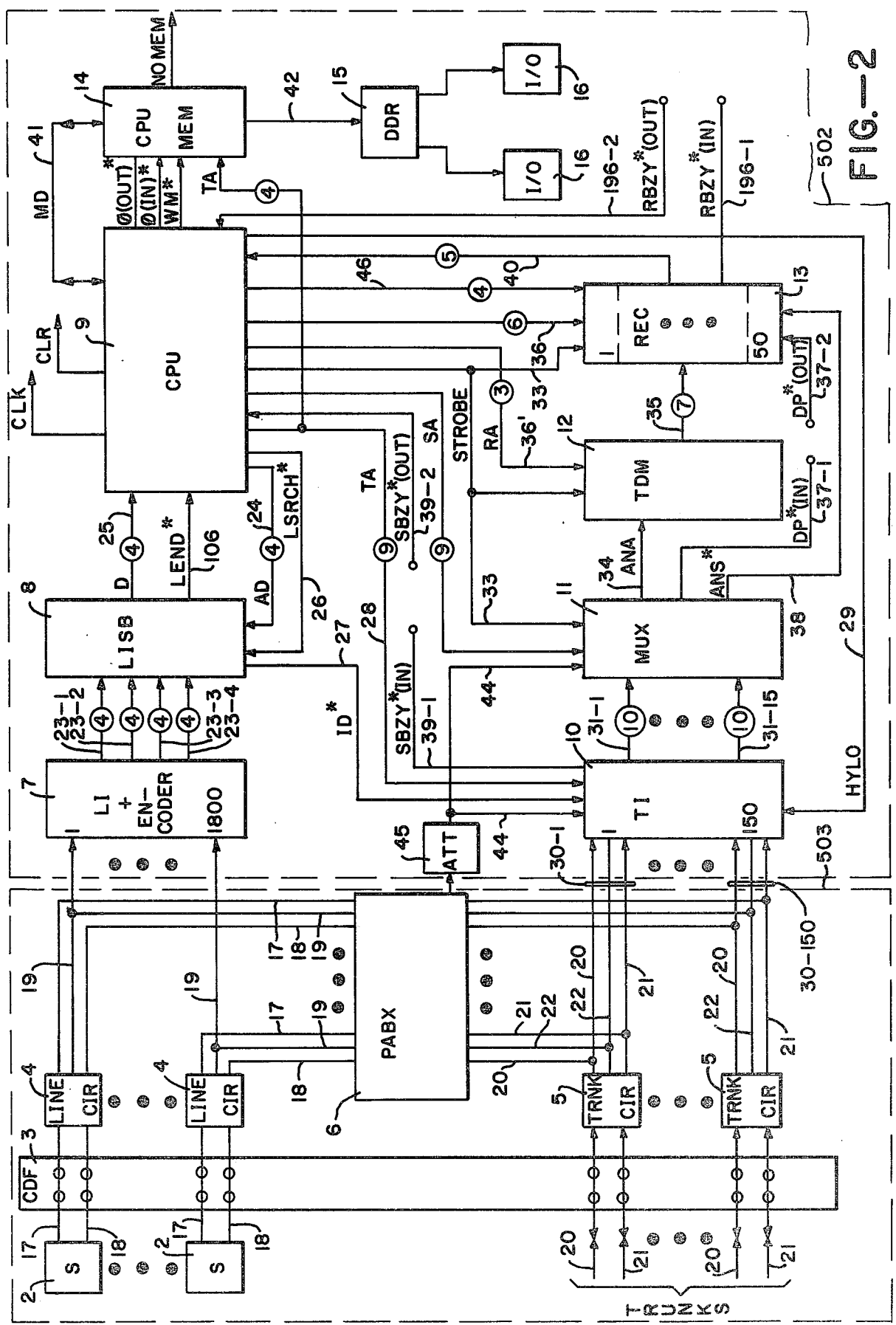

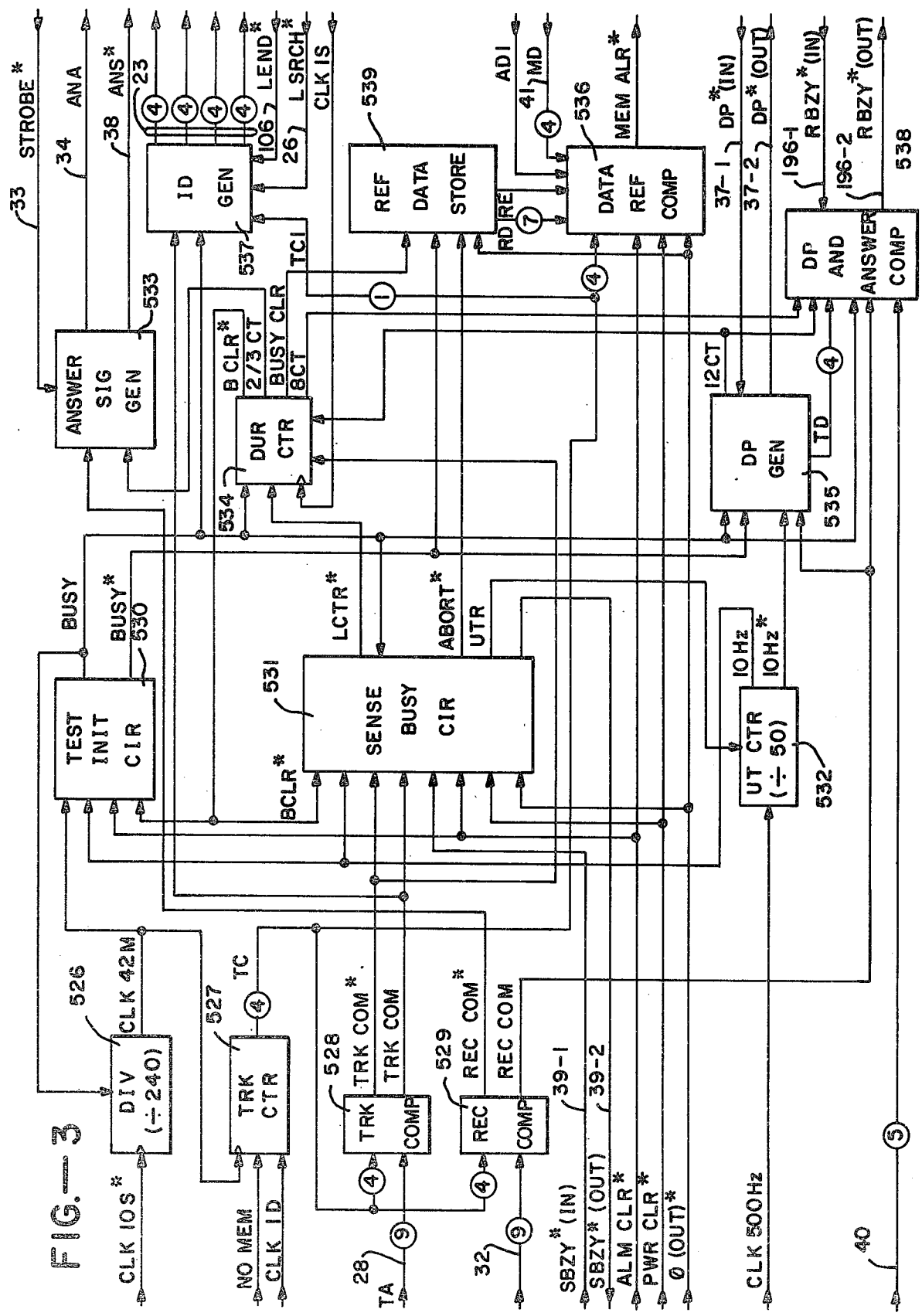

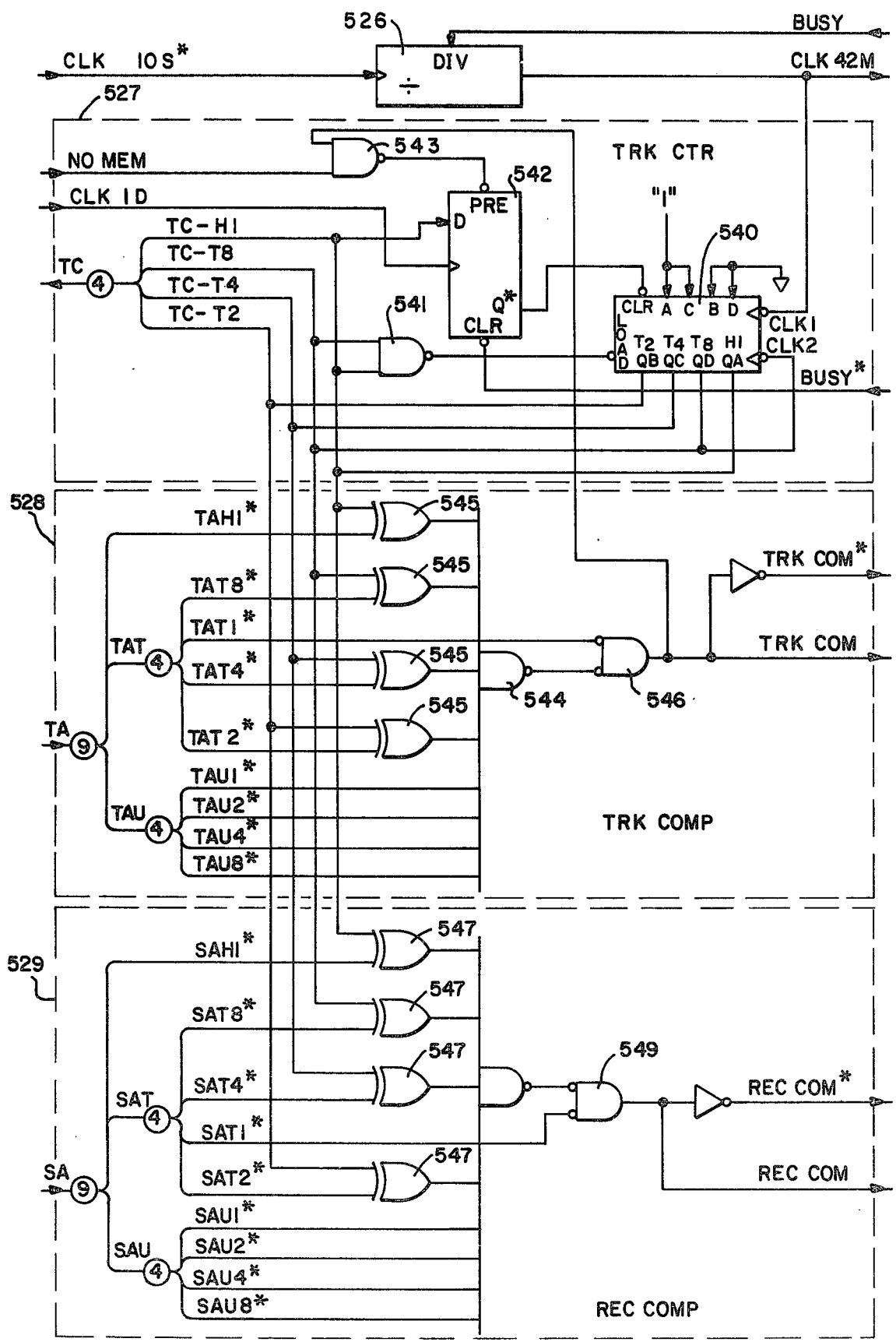
FIG.—4

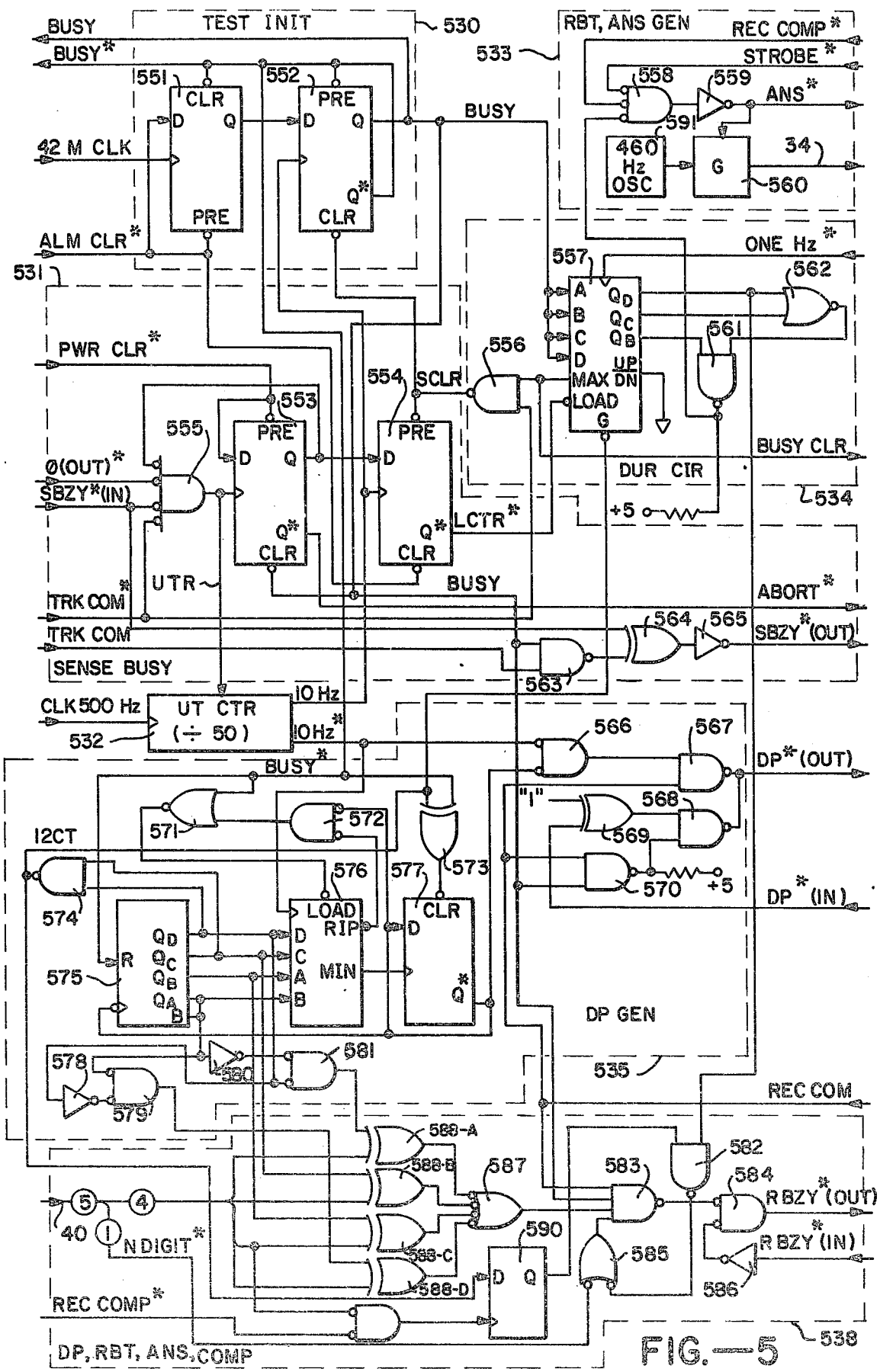
FIG.—5

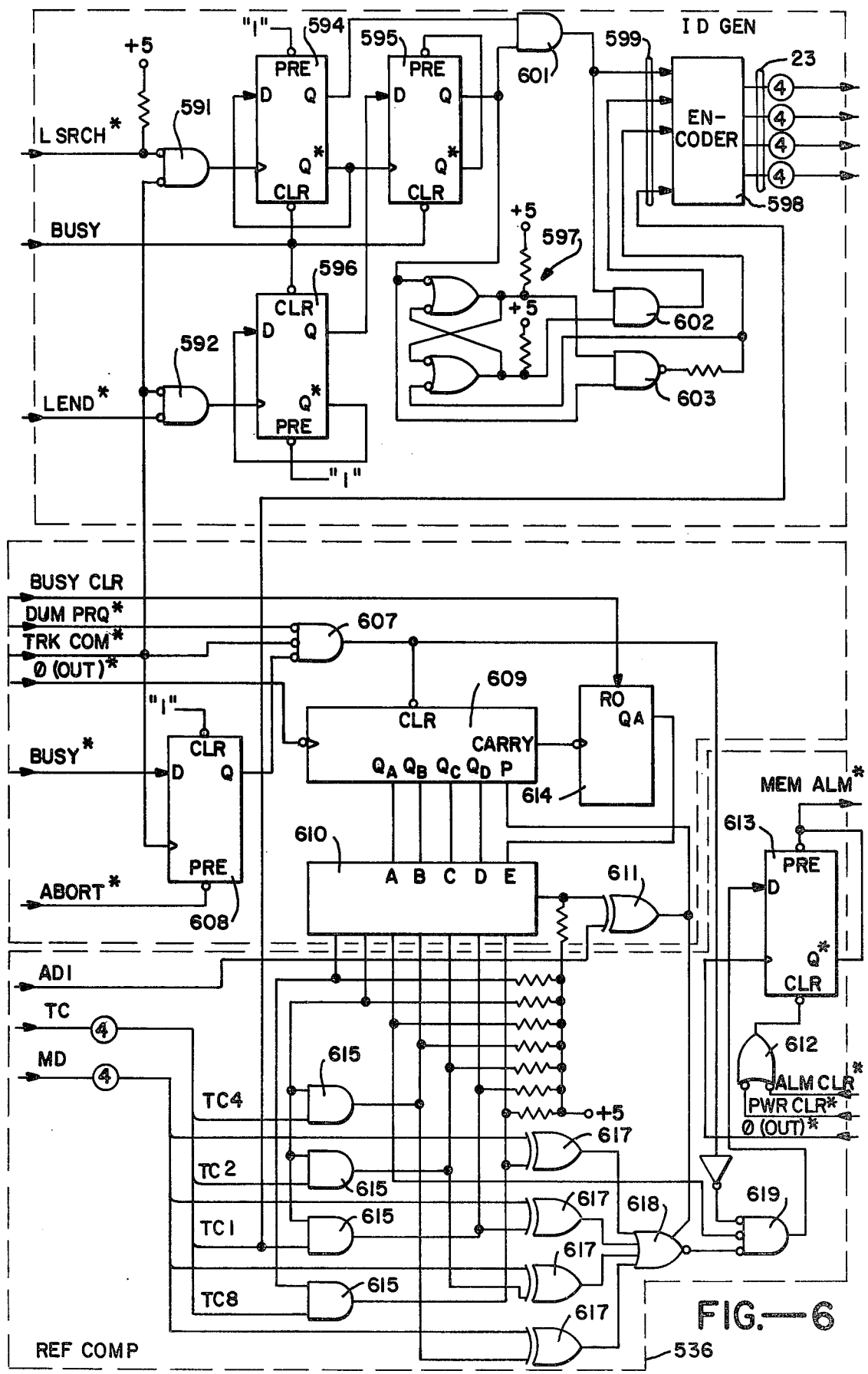
FIG.—6

DATA VERIFIER

This is a continuation, of application Ser. No. 664,103 filed Mar. 5, 1976 now abandoned.

CROSS REFERENCE TO RELATED APPLICATIONS

1. Line Identification and Metering System, Ser. No. 449,384, filed Mar. 8, 1974, invented by Harold Tysseland and assigned to the assignee of the present invention, now U.S. Pat. No. 3,925,623.
2. Ringback Tone Apparatus and Telephone Metering System, Ser. No. 438,418, filed Jan. 31, 1974, invented by Clare G. Keeney, and assigned to the assignee of the present invention, now U.S. Pat. No. 3,920,913.

BACKGROUND OF THE INVENTION

The present invention relates to the field of data verifiers and test apparatus and particularly to data verifiers for testing multiplexing systems such as telephone message metering apparatus.

In telephone systems, message metering equipment is useful for detecting and recording information about toll long distance and other types of telephone service. The equipment usually provides the capability of identifying and storing which line or which extension number on the line is the calling party. Such information is particularly desirable in telephone usage accounting and telephone usage engineering. Usage accounting is the function of identifying particular lines or extensions which place a call and assigning the responsibility for the cost of the calls to a particular department or person. Usage engineering is the function of providing communications engineers with call usage levels, grading indications, maintenance trends, and accurate loading figures for determining overall equipment requirements.

One message metering system capable of performing the above functions is described in the above cross-referenced applications and in U.S. Pat. No. 3,870,823.

Whenever message metering equipment is employed, it is desirable to periodically test the metering apparatus itself to facilitate detection of faulty operation before large quantities of erroneous data are collected. While the above-mentioned systems do contain error detection circuitry, additional and improved techniques are desirable for verifying the operation of message metering system and data multiplexing systems. In accordance with this background, it is an object of the present invention to provide an improved data verifying apparatus for use with telephone message metering equipment and other multiplexing systems.

SUMMARY OF THE INVENTION

The present invention is a data verifying apparatus for verifying the operation of multiplexing systems which first multiplex data from data sources over a common multiplex channel and thereafter demultiplex data to data sinks.

In accordance with the present invention, the data verifier includes a test generator for inserting test information into the multiplex channel in place of normal data. The data verifier also includes a comparator for comparing demultiplexed output information with reference information to determine if the multiplexing system has operated properly.

In one embodiment, the data verifier includes a test initiate circuit for initiating a verification test in response to input signals and for storing busy signals for signaling when the data verifier is in busy and non-busy states.

In one embodiment, the data verifier includes sense busy circuitry for detecting when the multiplex channel is busy handling data so that a verification test can be prevented or so that a verification can be aborted if one has been initiated.

In accordance with one feature, the data verifier includes a trunk counter for specifying a trunk address associated with the data verifier. A trunk address comparator is provided for comparing the trunk address in the multiplexing system with the data verifier trunk counter address for determining when the trunk addresses in the multiplexing system and the data verifier are the same. A receiver address comparator is provided for comparing the trunk counter address with a sample address which specifies a receiver in the multiplexing system. Actions are taken in the data verifier conditioned upon identity between the addresses in the data verifier and addresses in the multiplexing system.

In accordance with another feature, a line identification generator is provided for generating a line-identification test signal for testing equipment in the multiplexing system which normally operates to identify which station line is connected to a busy outgoing trunk line.

In accordance with another feature, a dial pulse generator is provided for generating dial pulse test signals for testing equipment in the multiplexing system which normally operates to detect dialed pulses going out over a busy trunk.

In accordance with another feature, an answer signal generator is provided for generating answer test signals for testing equipment in the multiplexing system which normally operates to identify when a call placed out over a busy trunk has been answered. The answer signal is either a ring back tone or an answer supervision signal.

With the above test signal generators the data verifier includes comparators to determine whether the test signals generated by the data verifiers have been received and properly processed by the multiplexing system. A comparator is provided for determining whether the answer test signals and the dial pulse signals have been properly processed.

In accordance with another feature, a reference information store and a reference comparator are provided for determining whether information stored in the multiplexing system, as a result of data verifier tests, is correct.

In accordance with the above summary, the present invention achieves the objective of providing an improved data verifier for use in checking the operation of multiplexing systems.

BRIEF DESCRIPTIONS OF THE DRAWINGS

FIG. 1 depicts an overall block diagram representation of a multiplexing system, connected to multiplex data inputs from a data source, and a representation of a data verifier connected to verify operation of the multiplexing system in accordance with the present invention.

FIG. 2 depicts a block diagram representation of a multiplexing system which is a message metering system for a telephone private automatic branch exchange.

FIG. 3 depicts a block diagram representation of the data verifier in the FIG. 1 apparatus and which verifies the operation of the message metering system in FIG. 2.

FIG. 4 depicts a schematic representation of the divider, trunk comparator and receiver comparator circuits which form a part of the data verifier of FIG. 3.

FIG. 5 depicts a schematic representation of another part of the data verifier of FIG. 3.

FIG. 6 depicts a schematic electrical diagram of the line-identification generator, the reference store, and the reference comparator circuitry which form another part of the data verifier of FIG. 3.

DETAILED DESCRIPTION

In FIG. 1, N data inputs 504 are provided by a data source 503 to a multiplexing system 502. In one embodiment of the present invention to be described in detail, the source 503 is a telephone private automatic branch exchange, the data inputs 504 are trunk lines, and the multiplexing system 502 is a message metering system which functions to meter telephone calls on outgoing trunks.

In FIG. 1, the data verifier 501 functions to monitor the multiplexing system 502 to verify or detect errors in operation.

In FIG. 1, the multiplex system 502 includes a multiplex circuit 505 which receives the N data inputs 504 and multiplexes them onto the multiplex channel 513. Under normal operation, multiplexed data on the channel 513 passes through selection circuit 506 to the multiplex channel 514 and is demultiplexed into N different locations in a data sink 509. The multiplexing and demultiplexing, as well as many other functions in the multiplexing system, is under control of the address and control circuitry 508.

In FIG. 1, the data verifier 501 includes a test generator 510 which generates test signals for insertion into the multiplex channel 513 through selection circuit 506. When a test signal is inserted in this manner, the test signal appears on multiplex channel 514 in the same manner that a normal data signal would appear on the channel. The test signal is demultiplexed into one of the N locations in data sink 509. The N locations in data sink 509 are periodically accessed to provide their contents on output line 517. When data sink 509 includes a recirculating memory, information form line 517 is reinserted into the data sink 509 through a connection (not shown) to channel 514. At the same time, information on output 517 is input to the test comparator 512 of the data verifier 501. The test comparator 512 compares the information on output 517 with reference information from a reference store 511. The addressing and control of the test generator 510 and the test comparator 512 are controlled by address and control circuitry 518. Test signals are generated and test comparisons are made at times when the addresses in the data verifier correspond to addresses in the multiplexing system.

In FIG. 2, further details of one embodiment of the source 503 and the multiplex system 502 are shown. The N data inputs 504 in FIG. 1 correspond to the 150 trunk lines 30-1 through 30-150 in FIG. 2.

In FIG. 2, the data source 503 is a private automatic branch exchange (PABX) telephone system. The telephone system includes telephone stations 2 connected to tip and ring lines 17 and 18, respectively, over a central distribution frame (CTF) 3 to respective line circuits 4. Within the line circuits 4, each tip and ring line is associated with a sleeve line 19. In a typical configuration, up to 1800 stations and 1800 associated line circuits are connected to an exchange 6. Each of the tip, ring and sleeve lines 17, 18, and 19 are available for connection by the exchange 6 to trunk tip, ring, and sleeve lines 21, 22, and 23 respectively. The trunk tip, ring and sleeve lines from the exchange 6 are connected to trunk circuits 5 to the trunk interface (TI) 10 within the message metering system 502. The trunk circuit 5 in turn have the trunk tip and ring lines 20 and 21, respectively, connected to the central distribution frame 3 where they are connected to the outgoing trunk lines.

The metering system 502 is connected to the telephone system 503 on both the station and trunk sides of the exchange 6. Each of the sleeve lines 19 from the line circuits 4 on the station side of the exchange 6 are connected as input to the line interface and encoder 7. In a typical configuration, the exchange 6 is a private automatic branch exchange (PABX) of the 701 B type which services up to 1800 lines. Accordingly, the line interface and encoder 7 receives 1800 input sleeve lines 19.

The line interface and encoder 7 is a tree circuit encoder which senses a line identification signal on one of the sleeve lines 19 and identifies which one of the lines 19 has the signal by energizing the four 4-bit binary coded decimal (BCD) output lines 23. The lines 23 are input to the line interface storage buffer (LISB) 8. The LISB 8 functions, on command from the central processing unit (CPU) 9, to convey the address of an identified line 19 over the 4-bit D bus 25 to the CPU 9.

The line interface storage buffer 8 is the circuit which initiates the ID* signal on line 27, on command from the central processing unit 9. When generated, the ID* signal is connected through the trunk interface 10 to a busy one of the trunk sleeve lines 22. From there, the ID* signal is connected through the exchange 6 to the associated sleeve 19. The associated sleeve 19 conducts the ID* signal to the encoder 7 which thereby designates, on the BCD outlines 23, an identification of which station 2 is connected to the busy trunk 22. The BCD identification on lines 23 uniquely identifies one of 1800 sleeves 19. In addition to identifying sleeves 19, the 16-bit bus 23 in FIG. 2 is connected to receive a 16-bit BCD address from the data verifier of FIG. 3. That BCD address from FIG. 3 is a test signal which is inserted to test the operation of the metering system 502.

The storage buffer 8 is connected to the central processing unit 9 by the data bus (D) 25 for transmitting the BCD addresses, four bits at a time, to unit 9. The storage buffer 8 is addressed for operation by an address bus (AD) 24 from unit 9. Storage buffer 8 starts a station line search by generating an ID* signal when the LSRCH* command appears on line 26 and storage buffer 8 indicates that a station attempt line has been completed by a LEND* signal on line 106.

The trunk interface 10, in addition to being utilized in line identification, functions to indicate with an SBZY-*(IN) signal on line 39-1 whether an addressed trunk circuit 5 is busy or not. The addressing of the trunk circuit is by means of the central processing unit 9 which establishes a BCD trunk address (TA) on the 9-bit bus 28. The trunk address is input to the trunk interface 10 on bus 28. The trunk address is sequentially stepped and in so doing sequentially samples the busy condition of all of the trunks 30, one at a time, by detecting the condition of each of the associated sleeve lines 22. In a typical configuration, up to 150 trunk circuits 5 are available and each one is uniquely identified by a different BCD address on TA bus 28.

The SBZY* (IN) signal on line 39-1 connects to the SBZY* (OUT) signal on line 39-2 when the data verifier of FIG. 3 is not employed. When the data verifier is employed, the SBZY* (IN) signal connects to the data verifier to prevent the data verifier from operating whenever a trunk is busy. The data verifier returns the SBZY* (OUT) signal to line 39-2 in FIG. 2.

Each time a busy trunk is detected by trunk interface 10, a sleeve busy signal SBZY* (OUT) is communicated to the central processing unit 9 via line 39-2 for updating a CPU memory 14. Memory 14 has a corresponding location for storing a busy signal for each trunk. The trunk interface 10 additionally connects the signals on the 150 sets of tip and ring lines 20 and 21 as data inputs to the multiplexer 11. The multiplexer 11 corresponds to the multiplexing circuit 505 in FIG. 1.

In FIG. 2, the multiplexer 11 receives an analog line for each of the trunk circuits 5. In the example chosen, 150 trunk circuits 5 are present so that 150 analog lines are input to the multiplexer 11. The analog lines are input to the multiplexer 11 in groups of ten indicated as 31-1 through 31-15. The function of the multiplexer 11 is to select one out of 150 of the input lines for connection to the output lines. The output lines include an analog ANA line 34, a dial pulse DP* (IN) line 37-1 and an answer detection ANS line 38.

When the data verifier of FIG. 3 is not employed, the DP* (IN) line 37-1 connects directly to the DP* (OUT) line 37-2. With the data verifier the DP* (IN) line connects to the verifier and the DP* (OUT) line is returned from the verifier.

The lines 34, 37 and 38 in FIG. 2 each correspond to the multiplex channel 513 in FIG. 1. Each one of the 150 data input lines in the multiplexer 11 is selected for a sample duration under control of the 9-bit BCD sample address (SA) on bus 32. The sample address (SA) is derived from the central processing unit 9. Additionally, a STROBE* signal on line 33 is also derived from unit 9 to control timing. In FIG. 2, the time division demultiplexer (TDM) 12 receives the analog line (ANA) 34 from the multiplexer 11 and functions to time division demultiplex signals on 34 out over the seven lines 35. The timing of the demultiplexer 12 is controlled by the strobe line 33 and the three high-order bits of a receiver address (RA) on line 36 which is derived from the central processing unit 9.

In FIG. 2, a receiver (REC) group 13 functions to receive and analyze information from the demultiplexer 12 and the multiplexer 11. Receiver group 13 typically includes up to 50 receivers. Only one of the 50 receivers is addressed and operative to output data at any one time although more than one may be active to process data. The operative receiver is designated by the 6-bit receiver address (RA) on bus 36 which are received from the central processing unit 9. The 50 receivers 13 are one example of data sink 509 in FIG. 1.

A predetermined relationship is established in the CPU 9 between the sample address (SA) and the receiver address (RA) to associate a particular one of the 50 receivers 13 with a particular one of the trunk circuits 5. The information from the receivers 13 is output on the 5-bit DIGIT bus (DB) 40 which includes the bits D1*, D2*, D4*, D8* and N DIGIT*. The bus 40 is connected to the 50 receivers 13 one at a time. The bus 40 is one embodiment of the bus 517 in FIG. 1.

The receivers 13 are of several different types. One type, a dial pulse receiver, is for detecting and counting dial pulses. Another type, an answer supervision receiver, is for detecting an answer supervision signal when the exchange 6 is of the type which has answer supervision.

Another type, a multifrequency receiver, is for analyzing the signals in a multifrequency system. Another type, a ringback tone receiver, is for detecting the ringback tone to determining a called party answer in systems which do not have answer supervision.

In FIG. 2, when data is available from a receiver or other units within the metering system 502, the central processing unit 9 transfers the data out over a memory data (MD) bus 41 which connects as an input to the CPU memory 14. In one embodiment, memory 14 is a recirculating memory which is stepped in synchronism with the trunk address (TA). Output data also appears on the memory data (MD) bus 41 and that data relates to the trunk defined by the current trunk address. In the absence of new data, the data bus 41 recirculates the old data for restorage into memory 14. The memory 14 is also connected to a data dump register (DDR) 15 which in turn connects to various I/O devices 16 for transferring data out from memory 14.

In FIG. 2, the memory 14 is also another embodiment of the data sink 509 in FIG. 1. The memory bus 41 in FIG. 2 also corresponds to the bus 517 in FIG. 1.

Further details of the nature and operation of the various components within the FIG. 2 circuitry are described in detail in the above cross-referenced applications. Those applications are hereby incorporated by reference in this application, in their entirety, for teaching the details and operation of one embodiment of a message metering system as shown in FIG. 2.

In FIG. 3, details of one embodiment of the data verifier of FIG. 1 are shown. All of the input lines to and the output lines from the FIG. 3 data verifier are derived from the metering system 502 of FIG. 2. The divider (DIV) 526 is a standard divide-by-256 counter which counts down the ten second clock signal CLK10S* to form a 42 minute clock signal CLK42M.

The trunk counter (TRKCTR) 527 functions to provide a 4-bit trunk counter address (TC) which represents one out of up to 16 different trunk addresses of the 150 trunk addresses which are possible in the metering system 502 of FIG. 2. The trunk counter address TC is advanced by the CLK42M signal and by the one day clock signal (CLKID). The counter 527 is preset by the operation of a no memory signal NOMEM which is derived from the CPU memory 14 of FIG. 1 and a TRKCOM signal.

A trunk comparator (TRKCOMP) 528 is provided for comparing the trunk counter address (TC) specified in data verifier 501 with the trunk address (TA) specified in the metering system 502. Whenever the addresses (TC) and (TA) are the same, comparator 528 provides a 1 for the TRKCOM signal and a 0 for the TRKCOM* signal.

In FIG. 3, a receiver comparator (RECCOMP) 529 is provided for comparing the trunk counter address (TC) with the address of a receiver specified by the sample address SA. Whenever the TC and SA addresses compare, the comparator 529 provides the RECOM signal as a 1 and the RECOM* signal as a 0.

In FIG. 3, the test initiate circuit 530 functions to initiate a data verification test. The circuit 530 initiates a verification test once every 42 minutes, in response to the CLK42M signal from the counter 526, or whenever the ALMCLR* signal is 0. When initiated by one of those two signals, the circuit 530 signifies that a verification test has been initiated by providing the BUSY signal as a 1 and the BUSY* signal as a 0. When a verification test has been completed, the BCLR* signal output from the duration circuit 534 clears the test initiate circuit 530 to provide a 0 for the BUSY signal and a 1 for the BUSY* signal.

In FIG. 3, the sense busy circuit 531 is responsive to the SBZY*(IN) signal on line 39-1 from the metering system 502 of FIG. 2 to determine whether the currently addressed trunk in the telephone system 503 of FIG. 2 is busy or not. The sense busy circuitry 531 in FIG. 3 is active when the trunk address TA and the trunk counter address TC are the same as determined by the trunk comparator 528.

If the trunk addressed in FIG. 2 is not busy and a verification test has been initiated by the initiate circuit 530, then the sense busy circuit 531 responsively provides an SBZY*(OUT) signal on line 39-2 to signal the status to the CPU 9 in FIG. 2. If at any time the trunk FIG. 2 goes busy during a test, circuit 531 detects that condition and stops the test by generating the ABORT* signal. The timing of operations in the circuit 531 is under control of the 10 Hz signal from the utility counter 532 in FIG. 3 and the $\phi(OUT)^*$ signal from the CPU 9 of FIG. 2. The circuit 531 is also reestablished by a PWRCLR* signal which results from a power on condition which follows a power off condition. The sense busy circuitry 531 also generates an LCTR* signal which controls the parallel loading of the duration circuit 534 for resetting of the busy status of the data verifier with the BCLR* signal and the BUSYCLR signal. Also, the sense busy circuitry functions to reset a utility counter 532 with the UTR signal when a trunk is busy.

In FIG. 3, the utility counter 532 is a conventional divide-by-50 counter which counts down the CLK500 Hz signal to provide the 10 Hz and 10 Hz* output signals unless held reset by the UTR signal.

In FIG. 3, the duration circuit 534 functions when enabled by the 12 CT signal, to serially count one second clock pulses from the CLK1S line to time various periods associated with a verification test. The duration counter 534 includes a number of decoded outputs which, together with the TRKCOM* signal from comparator 528 function to control the operation of duration circuit 534. Counter 534 generates the ⅔ CT signal which is active during the second and third counts of counter 534 which functions to enable the answer signal generator 533. Counter 534 generates an 8CT signal on its eighth count to enable the comparator 538.

In FIG. 3, the dial pulse generator (DPGEN) 535 is responsive to the busy signals from the test initiate circuit 530 to generate dial pulse test signals which are connected to the message metering system of FIG. 2 over the DP*(OUT) line 37-2. Whenever the test circuit 530 indicates that the data verifier of FIG. 3 is not busy, then the dial pulse line DP*(IN) 37-1 from the FIG. 2 circuit connects pulses directly to the DP*(OUT) line 37-2. When a test signal is generated, generator 535 also gates dial pulses onto the line 37-2 under the timing control of the 10 Hz* signal from the utility counter 532 at times when the RECCOM signal from comparator 529 indicates that the SA and TC addresses compare.

The 4-bit TD bus from the dial pulse generator 535 indicates the number of pulses in each digit output by generator 535 on the line 37-2. Generator 535 produces from 0 to 11 dial pulses. After the digit having 11 dialed pulses is output, the dial pulse generator provides the 12 CT signal to indicate that the generator 535 has completed its function.

In FIG. 3, the answer signal generator (ANSWER SIG GEN) 533 is enabled during the ⅔ CT period of the duration circuit 534 to generate either a ringback tone signal on the analog (ANA) line 34 or to generate an answer supervision (ANS*) on the line 38. Both of the signals on lines 34 or 38 are generated for use pending upon the type of telephone system 503 which is being metered by the message metering system 502. Generator 533 is operative only when the comparator 529 indicates that the SA and the TC addresses compare. Timing for the generator 533 is derived from the STROBE* signal on line 33.

In FIG. 3, the line identification generator (IDGEN) 537 functions to generate, in BCD format, a 16-bit address which is a test signal representative of one of the station lines 19 in FIG. 2. That address appears on bus 23 which connect to the encoder 7 of FIG. 2. In FIG. 3, the ID generator 537 generates the BCD address whenever the test indicator circuit 530 indicates that a verification test has been initiated. The generator 537 is started when the first bit, TC1, of the trunk counter address TC is 0. Also the ID generator 537 generates the address on command the LSRCH* signal and terminates the addresses on the LEND* signal.

In FIG. 3, a referenced store 539 is provided to store information for comparison with the output form the message metering system 502 of FIG. 2 which occurs in response to the test signals generated by the FIG. 3 apparatus. The reference store 539 includes a plurality of storage locations which are sequentially addressed under control of the O/(OUT)*, ABORT*, BUSYCLR, and BUSY* signals. Each storage location in store 539 outputs information on the 7-bit RD bus. The reference store 539 also provides a reference enable RE signal when reference information is available for comparison.

In FIG. 3, the reference comparator 536 functions to compare selected bits from the 7-bit RD reference information bus with memory data on the MD bus 41 from the CPU memory 14 in FIG. 2. The bits selected for comparison in data comparator 536 are under control of the trunk counter address TC. Comparisons are made with timing controls by the AD1 line from the 4-bit AD bus 24 and from the $\phi$ (OUT)* timing signal. Whenever a wrong comparison occurs between the reference data on the RD bus and the memory data on the MD bus, the data comparator 536 provides a 0 for the MEMALR* memory alarm signal.

In FIG. 3, the reference data store 539 is one embodiment of the reference data circuit 511 in FIG. 1. The data comparator 536 in FIG. 3 is one embodiment of the test comparator 512 in FIG. 1.

In FIG. 4, further details of a portion of a FIG. 3 data verifier are shown. Specifically, the divider 526, the trunk counter 527, the trunk comparator 528 and the receiver comparator 529 are shown in FIG. 4.

The divider 526 in a preferred embodiment is two, serially connected 4-bit binary counters combined to yield a divide-by-256 counter. Counter 526 divides the 10 second clock signal CLK10S* by 256 to arrive at the approximately 42 minute clock signal CLK42M.

In FIG. 4, the trunk counter (TRKCTR) 527 includes a conventional counter 540. Counter 540 is clocked to serially count by the CLK42M signal on the CLK1 input. The QD output connected to the CLK2 input causes counter 540 to count in biqinary order. Counter 540 is set to store 1's on the A and C inputs and 0's on the B and D inputs when a 0 from NAND gate 541 connects to the load input. Counter 540 is cleared to all 0's with a 0 from the Q* output of the conventional D-type flip-flop 542.

TABLE I

| TRK CTR ADD ----H1 | Biginary | | | | |
|---|---|---|---|---|---|
| | T8 | T4 | T2 | T1 | |
| TRK CTR OUT ----QA | QD | QC | QB | | |
| TRK CTR IN ---- A | D | C | B | | DECIMAL |
| 0 | 0 | 0 | 0 | 1 | 010 |
| 0 | 0 | 0 | 1 | 1 | 030 |
| 0 | 0 | 1 | 0 | 1 | 050 |
| 0 | 0 | 1 | 1 | 1 | 070 |
| 0 | 1 | 0 | 0 | 1 | 090 |
| 1 | 0 | 0 | 0 | 1 | 110 |
| 1 | 0 | 0 | 1 | 1 | 130 |
| 1 | 0 | 1 | 0 | 1 | 150 |
| 0 | 0 | 0 | 0 | 1 | 010 |

The manner in which counter 540 counts is represented in TABLE I. The QA, QD, QC, and QB trunk counter outputs represent the hundredths H1, tens T8, tens T4 and tens T2 digits of the trunk counter addresses. The tens T1 digit of the trunk counter addresses is not derived from counter 540 but is interpreted only as a 1 by the trunk comparator 528 and the receiver comparator 529 in FIG. 4. Also, the entire units digit is interpreted as a BCD zero by the trunk and receiver comparators. The trunk counter 540 parallel inputs A, D. C, and B, the outputs QA, QD, QC, and QB and trunk counter addresses are all indicated in TABLE I. With these designations for the trunk counter the trunk counter is stepped in biqinary fashion. The decimal equivalent for the trunk address is shown to the right of the biqinary states of counter 540 in TABLE I. Counter 540 counts from an initial trunk counter address of 010 decimal in jumps of 20. Counter 540 is enabled to count when the Q* output of flip-flop 542 is a 0. Flip-flop 542 is preset to a 0 on its Q* output by operation of the NAND gate 543. Whenever a TRKCOM signal and a NOMEN signal are both 1's, gate 543 becomes satisfied to preset flip-flop 542. Under normal conditions the signal NOMEN is 0 so that gate 543 provides a 1 output which does not preset flip-flop 542.

The CLR input to flip-flop 542 connects to the BUSY* line. Whenever the data verifier is busy as indicated by a 0 for the BUSY* signal, flip-flop 542 is held in a clear state with a 1 on the Q* output. The 1 on the Q* output removes the clear input from counter 540 and allows the counter to maintain its address throughout the test call. Each time the data verifier goes busy, the BUSY signal holds the divider 526 reset. As long as flip-flop 542 remains with a 1 on its Q* output, counter 540 counts each new CLK42M pulse, one each time the data verifier goes not busy thereby enabling divider 526 to count the CLK10S* pulses.

Counter 540 counts in the sequence in accordance with TABLE I. When counter 540 reaches the count of 150, NAND gate 541 produces a 0 output which parallel loads the signals on the trunk counter inputs. The signals on the trunk counter inputs represent a count of 150 so that counter 540 becomes locked at the 150 count ignoring any further clock inputs from the CLK42M line. With counter 540 at a count of 150, or at count 110 or greater, the QA output is a 1. The 1 on the QA output connects to the D input of flip-flop 542. Whenever a once a day clock pulse, CLK1D, occurs with a 1 on the D input of flip-flop 542, flip-flop 524 is clocked to have a 0 on the Q* output. That 0 clears the counter 540 to a 010 count. When the BUSY* line again goes 0, flip-flop 542 is cleared to have a 1 on its Q* output and thereby removes the clear from counter 540. Counter 540 is thereafter able to again count from 010 to 150 in the manner indicated in TABLE I.

At the 150 count, NAND gate 541 loads the 150 count into counter 540 and counter 540 is again locked on the 150 count. Counter 540 is not again enabled to count until the next day when the CLK1D signal again appears. If at any time the NOMEM signal becomes 1 when the TRKCOM signal is also 1, flip-flop 542 is immediately preset to clear the counter 540.

In FIG. 4, the tens and hundreds bits output from the counter 540 are compared with the corresponding tens and hundreds digits of the trunk address TA. The comparison occurs on a bit for bit basis in the four EXCLUSIVE-OR gates 545. The five non-compared bits of the TA address are input directly to the NAND gates 544 and 546. Whenever the trunk counter address specified by counter 540 is identical to the address specified by the trunk address TA, NOR gate 546 provides a one output for the TRK COM signal for indicating that comparison.

In FIG. 4, the receiver comparator 529 receives the 4-bit TC address from the counter 540. Those 4 bits are compared in EXCLUSIVE-OR gate 547 with the four correspondingly weighted bits in the 9-bit sample address SA. Whenever the sample address SA compares with the trunk address TC, NOR gate 549 produces a one output for the RECCOM signal to indicate the comparison.

In FIG. 5, the test initiate circuit 530 of FIG. 3 is shown in more detail. Circuit 530 includes the conventional D-type flip-flop 551 which has its Q output clocked to a 1 by the CLK42M signal from the divider 526 of FIG. 3. The 1 from the Q output of flip-flop 551 is transferred to the conventional D-type flip-flop 552 by operation of the 10 Hz output from the utility counter 532. The Q output of flip-flop 552 is the BUSY signal and the Q output is the BUSY* signal. Flip-flop 551 can also be set to a 1 on its Q output by the ALMCLR* signal which can be a manual input signal for initiating the operation of the data verifier. Flip-flop 551 is cleared by the Q* output of flip-flop 552 after the transfer from flip-flop 551 to flip-flop 552. Flip-flop 552 is held with a 1 on its Q output by the preset input from its Q* output. Flip-flop 552 is cleared by the SCLR* signal output from the duration circuit 534 after a verification has been completed by the data verifier of the present invention.

In FIG. 5, the sense busy circuitry 531 receives the SBZY*(IN) signal from the trunk interface in the FIG. 2 apparatus and returns the SBZY*(OUT) signal to the central processing unit 9 in FIG. 2. When a trunk is busy in the FIG. 2 apparatus, the SBZY*(IN) signal is 0. If the data verifier is busy, NAND gate 563 receives a 1 on the BUSY output from flip-flop 552. NAND gate 563, when the TRKCOM signal is 1 provides a 0 to the EXCLUSIVE-OR gate 564. With two 0's into gate 564, a 0 output is provided which is inverted in inverter 565 to a 1. The 1 is an incorrect level for the SBZY*(OUT) signal since if the SBZY*(IN) signal is 0, the SBZY*(OUT) signal should also be 0. That error is intentionally created when the BUSY signal is also 1 since the data verifier should not be busy at a time when a trunk is also busy. If the BUSY line is 0, then the output from NAND gate 563 is 1 and the output from gate 564 is 1 so that the output from gate 565 is 0.

If the SBZY*(IN) input to gate 555 is 1, the output from the gate is 0. That 0 removes the reset input to the utility counter 532 allowing the counter to produce the 10 Hz and the 10 Hz* output pulses.

During normal operation when the trunk is not busy and therefore SBZY*(IN) is 1, the output from gate 564 is 1 if the data verifier BUSY signal is 1. The 1 is inverted in gate 565 so that the SBZY*(OUT) signal is 0 to indicate to the central processing unit 9 in FIG. 2 that the trunk appears to be busy although it is not. If the data verifier BUSY line is 0 then the SBZY*(OUT) signal is 1 and corresponds to the SBZY*(IN) signal.

If while the data verifier BUSY signal is 1 the SBZY*(IN) signal goes from 1 to 0, it signifies that a trunk has gone from non busy to busy. As timed by the φ (OUT)* signal and the TRKCOM* signal, the output from NOR gate 555 responsively goes from 0 to 1 to clock the D-type flip-flop 553 and to reset, and hold reset, the utility counter 532. When this occurs, the Q* output from flip-flop 553 goes to 0 to generate the ABORT* signal which signifies that the verification test should be aborted. The 1 for the Q output of flip flop 553 causes the NOR gate 555 to go to 0. That 0 removes the reset from counter 532 and allows counter 532 to clock flip-flop 554 to set the Q* output of flip-flop 554 to 0 before the Q output of flip-flip 553 goes to 0.

With the Q* output of flip-flop 554 0, the duration counter 557 is parallel loaded with 1's from the 1 on the BUSY line from flip-flop 552. The all 1 level of counter 557 provides a 1 on the MAX output which, together with a 1 for the TRKCOM* line provides a 0 from a NAND gate 556. The 0 from gate 556 clears flip-flop 552 to provide a 0 for the BUSY signal. The 0 BUSY signal is then parallel loaded into the counter 557 since flip-flop 554 still has a 0 on its Q* output. With counter 557 all 0's, the MAX output is 0 and the output from gate 556 goes to 1.

The 1 for the gate 556 output removes the preset input to flip-flop 554. On the next clock pulse of the utility counter 532, flip-flop 554 is clocked to provide a 1 on the Q* output. At this point, the parallel load input to counter 557 is removed and counter 557 retains an all 0 count.

In FIG. 5, the dial pulse generator 535 functions to receive the DP*(IN) signal from the message metering system of FIG. 2 and provides the DP*(OUT) signal back to that message metering system. Whenever the data verifier is busy as signified by a 1 for the BUSY signal from the flip-flop 552 and the receiver compare signal RECCOM is also 1, the DP*(OUT) signal is connected to provide test dial pulse signals through the NOR gate 566 and the NAND gate 567. If the data verifier is not busy as signified by a 0 for the BUSY signal, then the DP*(OUT) signal is the same as the DP*(IN) signal as connected through the EXCLUSIVE-OR gate 569 and the NAND gate 568 under control of the NAND gate 570.

In FIG. 5, the dial pulse generator 535 includes a digit counter 575 which counts up to 12 digits of a dialed number. Generator 535 also includes a dial pulse counter 576 which functions to control the number of dial pulses in each digit of the dialed number. The D-type flip-flop 577 functions to enable the output of dial pulses. Prior to generation of dial pulses, the BUSY* signal is a 1 at a time when the data verifier is not busy.

That 1 for the BUSY* signal functions to reset the counter 575 to all 0's. With counter 575 all 0's, the 12 count decoder NAND gate 574 has a 1 output which is input to the EXCLUSIVE-OR gate 573. That 1 plus the 1 for the BUSY* signal provide a 0 output from gate 573 which clears the flip-flop 577 to provide a 1 on its Q* output.

The BUSY* signal connects through NOR gate 471 to hold the counter 576 in the parallel load mode whenever the data verifier is not busy as signified by a 1 for the BUSY* signal. With counter 575 all 0's, those all 0's become loaded into counter 576. When BUSY* goes to 0, the output from gate 571 is a 1 which allows counter 576 to begin counting the 10 Hz* signals from utility counter 532. Counter 576 is a 4-bit binary counter connected to count from 15 down to 0 in 1.6 seconds. When counter 576 goes to an all 0 count, the MIN output goes from 0 to 1, thereby clocking the flip-flop 577. The Q* of flip-flop 577 goes to 0 thereby causing counter 575 to increment one count so that it has a count of 1.

The counter 576 counts in the down direction so that it goes from 1 to 0 and from 0 to 15. After counter 576 goes to an all 0 count, a 0 is provided on the RIP output. That 0, together with a 0 from the Q* output of 577 provides a 1 output from NOR gate 572. That 1 is propagated through NOR gate 571 as a 0 and causes counter 576 to be parallel loaded with the contents of counter 575. The four outputs QA, QB, QC, and QD of counter 575 are cross connected to the B, A, C, and D inputs of counter 576, respectively. With this cross connection of the inputs to counter 576 (that is, interchanging the order of the A and B inputs) the numbers which are loaded into counter 576 are not the same as the digit numbers in counter 575. Specifically, for numbers 0, 1, 2, 3, 4, 5, 6, 7, 8, 9, 10, 11, and 12 in counter 575 the numbers 0, 2, 1, 3, 4, 6, 5, 7, 8, 10, 9, 11, and 12, respectively, are loaded into counter 576.

With counter 575 storing a count of 1, a count of 2 is loaded into counter 576. With counter 576 loaded with a 2 count, it proceeds to be counted down from 2 to 0 by the 10 Hz* signal from the utility counter 532. When counter 576 reaches a 0 count, the MIN output goes from 0 to 1 and clocks flip-flop 577 causing it to have a 1 on its Q* output. That 1 prevents the gate 572 from having a 1 output so that, at this time, counter 576 is not parallel loaded and counter 576 continues to count down from the maximum count of 15 to the all 0 count in a period of 1.6 seconds. At the time that counter 576 again reaches the 0 count, the MIN output clocks flip-flop 577 causing its Q* output to go to 0. That MIN output 0 steps the counter 575 one count to a count of 2. After counter 576 outputs the MIN signal, the RIP output goes to 0. That 0 together with the Q* output of flip-flop 577 is propagated through gate 572 and gate 571 to parallel load counter 576 with the contents of counter 575. The count of 2 in counter 575 is loaded into counter 576 as a count of 1. At this time, utility counter 532 counts down the count in counter 576 from 1 to 0. At the 0 count, the MIN output clocks flip-flop 577.

The process of loading counter 576 with the contents of counter 575 is repeated continuously until counter 575 reaches a count of 12. When counter 575 reaches a count of 12, the NAND gate 574 provides a 0 output which through gate 573 clears and holds cleared the flip-flop 577.

Each time the counters 575 and 576 are loaded, dial pulses equal in number to the count in counter 576 are output through gate 566 and gate 567 to the DP*(OUT)

line. The dial pulses are output whenever the Q* output of flip-flop 577 is a 0. The output through gate 566 and gate 567 is therefore alternately interdigital pulses followed by a number of dial pulses. First, no pulses are output for an interdigital pause of 1.6 seconds. Next, two dial pulses are output, each 0.1 second long, followed by an interdigital pause of 1.6 seconds. Next the output is one dial pulse, having a 0.1 second duration and then the interdigital pause of 1.6 seconds occurs. Thereafter, three 0.1 second dial pulses are output followed by the interdigital pause of 1.6 seconds. This process continues for 4, 6, 5, 7, 8, 10, 9, and 11 dial pulses each separated by a 1.6 second pause. Thereafter, no further dial pulses are output since flip-flop 577 becomes locked with a 1 on its Q* output.

In FIG. 5, the comparator 538 functions to compare the dial pulse digits stored in counter 575 with the dial pulse digits detected by the message metering system of FIG. 2 as they appear on four of the bit lines of receiver bus 40. The four bit lines of bus 40 are D1*, D2*, D4* and D8* and they are connected as inputs to the EX-CLUSIVE-OR gates 588-B, 588-A, 588-C, and 588-D, respectively. The A, B, C, and D postscripts for the gates 588 correspond to the postscripts of the Q outputs from the counter 575. The order or the bits on bus 40 have been cross connected relative to the order of the gates 588 in the same manner that the outputs from counter 575 are cross connected with respect to the inputs of counter 576. In this manner, whatever number is loaded into counter 576 is the same number that the gates 588 look for on the bus 40. One exception exists, however, in that the gates 578, 579, 580 and 581 are a 10-to-0 converter which converts the count of 10 in counter 575 to a 0 count. The reason for this conversion is that telephone circuits and the message metering circuit of FIG. 2 recognize 10 pulses as a 0 count. When the DP*(OUT) line outputs 10 pulses, the message metering system of FIG. 2 recognizes those pulses as a 0 and encodes all 0's on the D1* through D8* bit lines of bus 40. When any gate 588 detects a comparison of input signals, the gate output is 0. For a 0 output from any gate 588, the output from NOR gate 587 is 1. That 1 signifies a non-comparison of the number of dialed pulses output through counter 576 and the number of dialed pulses detected as represented by the number on bus 4D. If all of the gates 588 provide a 1 output, the output from gate 587 is a 0, thereby indicating that the count on bus 40 equals the number of dial pulses output through counter 576.

Any non comparison wil cause the output from gate 587 to be a 1. That 1 combined with the 1's from other gates satisfy the NAND gate 583 causing its output to be a 0. A zero output from gate 583 is a receiver alarm signal. The 0 from gate 583 is input to the NOR gate 584, together with a 0 from gate 586, causing the RBZY*(OUT) signal to be 1 when the RBZY*(IN) signal is 0. Since the RBZY*(OUT) signal should also be a 0 at this time, the central processing unit 9 in FIG. 2 detects this condition as an error.

In FIG. 5, the duration counter 534 includes a counter 557. The counter 557, as previously explained, operates in the parallel mode in conjunction with the sense busy circuitry 531. Additionally, the counter 557 operates in a serial mode when enabled by a 0 output from the 12 count decoder NAND gate 574. With a 0 from gate 574, the G input of counter 557 is enabled allowing counter 557 to count the ONE Hz* signal. The QB, QC and QD outputs from counter 557 are decoded to time operations of the FIG. 5 apparatus. Specifically, the NAND gate 561 is a ⅔ count decoder which is utilized to enable the answer signal generator 533 during the second and third counts of counter 557. On the ⅔ count of counter 557, a 0 from gate 561 enables the NOR gate 558. When 0 RECCOMP* and STROBE* signals occur, gate 558 produces a 1 output which is inverted in inverter 559 to provide a 0 for the ANS* signal. If the telephone system of FIG. 2 includes the answer supervision capability, then that ANS* signal itself is employed as a test signal for the FIG. 2 message metering system. Alternatively, if the telephone system of FIG. 2 does not include an answer supervision capability, the output from inverter 559 enables the gate 560 which allows a 460 Hz signal from the oscillator 591.

When the ⅔ count of counter 557 has passed, the counter continues to count up until a count of 8 when the QD output is enabled with a 1 and is input to enable the NAND gate 582. The other input to gate 582 is derived from the conventional D-type flip-flop 590. Flip-flop 590 is clocked to have a 1 on its Q output by the operation of NOR gate 589. Gate 589 is enabled with a 0 from the RECCOMP* signal to sense the data on the D1* line of bus 40. When D1* is 0, flip-flop 590 is clocked to store the output of gate 574.

If on the 8th count of the duration counter, the flip-flop 590 has not been clocked with a 0 on its Q output, gate 582 becomes satisfied to provide a 0 output to NAND gate 585. The 0 into gate 585 produces a 1 on its output which enables gate 583. At this time, the output from gate 587 will also be a 1 so that gate 583 will provide an output 0 indicating a receiver alarm. If prior to the 8th count, flip-flop 590 has been clocked to a 1 on its Q output, no receiver alarm is generated.

In FIG. 6, the ID generator 537 includes three D-type flip-flops 594, 595 and 596 and a conventional latch 597 having Q and Q* outputs. Three output gates 601, 602 and 603 connect to an encoder 598 through lines 599. The encoder 598 encodes the signals on lines 599 and forms a BCD signal on the 16-bit output bus 23 in FIG. 6 which connects to the bus 23 in FIG. 2.

In FIG. 6, the NOR gate 591 provides a clocking signal to the flip-flop 594 whenever LSRCH* and TRKCOM* and 0. The NOR gate 592 provides a clocking signal to the flip-flop 596 whenever LEND* and TRKCOM* are 0. Whenever the BUSY signal is 1, the clear signal input to flip-flops 594, 595 and 596 is removed to enable the flip flops to be clocked. The LSRCH* and LEND* signals are received from the central processing unit 9 and the storage buffer 8, respectively of FIG. 2.

In the message metering system 502 of FIG. 2, a series of 8 LSRCH* pulses (0 level) are output by the central processing unit 9. Thereafter, the storage buffer 8 puts out 1 LEND* signal (0 level). If in response to the first set of eight LSRCH* pulses, four identical line addresses do not appear on the bus 23, the central processing unit 9 repeats with another set of eight LSRCH* pulses until, during one set, four identical detections are received.

In FIG. 6, the ID generator 537 is designed to respond to three sets of eight LSRCH* pulses to provide three sets of test signals on the bus 23. Generator 537 is active, however, only when the data verifier is busy as indicated by a 1 for the BUSY signal.

During the first set of eight LSRCH* pulses, the signals output from gates 601, 602 and 603 are 001. The 001 is input to encoder 598 on lines 599. An additional input to encoder 598 is a timing signal TC 1 which controls the timing of output signals on bus 23. A 001 signal on lines 599 causes encoder 598 to provide an all 0 signal on bus 23. When the LEND* signal occurs, the central processing unit 9 in FIG. 2 receives the all 0 signal through storage buffer 8 or the D bus 25 and then proceeds to a second set of eight LSRCH* pulses.

In FIG. 6, the operation of the ID generator 537 during the first set of eight LSRCH* pulses is as follows. The BUSY signal goes from 0 to 1 to enable the ID generator and to leave the flip-flops 594, 595 and 596 all initially in the cleared state with 0's on their Q outputs and 1's on the Q outputs. The first LSRCH* pulse clocks the Q output of flip-flop 594 to a 1 and the Q* output to a 0. The second LSRCH* pulse clocks flip-flop 594 with a 0 on its Q output and a 1 on its Q* output. Flip-flop 594 continues to be alternately clocked to a 1 and a 0 for each LSRCH* pulse.

During the first set of eight LSRCH* pulses, no LEND* pulses is received so that flip-flop 596 remains with a 0 on its Q output and a 1 on its Q* output. With a 0 on its Q output, flip-flop 595 receives that 0 on its D input and is continually clocked to have a 0 on its Q output and a 1 on its Q* output.

With a 0 continually present on the Q output of flip-flop 595, the latch 597 is held with a 0 on its output and a 1 on its Q* output.

With the above conditions occuring in response to the first set of 8 LSRCH* pulses, the 0 on the Q output from flip-flop 595 continually forces the output of AND gate 601 to a 0. The 0 output from gate 601 in turn continuously forces the output from AND gate 602 to 0. The 0 on the Q output of flip-flop 595 continuously forces the output from NAND gate 603 to 1. Accordingly, the 001 output from gates 601, 602, and 603 is unchanged to that the input to encoder 598 remains constant during the first set of LSRCH* pulses.

At the end of the first set of LSRCH* pulses, a LEND* pulse appears and clocks flip-flop 596 to a 1 on its Q output and a 0 on its Q* output. Thereafter the next set of eight LSRCH* pulses are received. The flip-flop 594 is alternately clocked to have a 1 on its Q output in response to the first, third, fifth, and seventh LSRCH* pulses and to a 0 in response to the second, fourth, sixth and eighth LSRCH* pulses. During this time, the Q output of flip-flop 596 remains 1. During the first LSRCH* pulse of the second set, the Q* output of 594 is negative-going and does not clock flip-flop 595. Therefore, after the first LSRCH* pulse, the Q output of flip-flop 595 remains unchanged as a 0. Accordingly, latch 597 is unchanged and the signals on lines 599 remain 001.

During the second LSRCH* pulse of the second set, the Q* output of flip-flop 594 is positive-going and clocks flip-flop 595 to produce a 1 on the Q output of flip-flop 595.

The 1 on the Q output of flip-flop 595 is input to the NAND gate 603, along with the 1 from the Q output of latch 597, and forces the output of gate 603 to 0. That 0 is input to switch latch 597 to produce a 0 on its Q output and a 1 on its Q* output.

Under these conditions, after the second LSRCH* pulse of the second set, the 0 from the Q output of flip-flop 594 forces the output of gate 601 to 0. That 0 in turn forces the output from gate 602 to be 0. The 0 on the Q output of latch 597 forces the output from gate 603 to be 1. Accordingly, the 001 signals on line 599 are unchanged.

For the third LSRCH* pulse of the second set, the Q outputs of flip-flops 594, 595 and 596 are all 1's. The Q* output of flip-flop 595 is 0 and operates, through the preset input to thereafter hold flip-flop 595 with a 1 on its Q output until flip-flop 595 is again cleared by a 0 busy signal. Latch 597 remains reset with a 0 on its Q output and a 1 on its Q* output. Under these conditions, the output from gate 601 is a 1 and the output from gates 601, 602 and 603 on lines 599 are all 1's. The all 1's on lines 599 cause encoder 598 to change from an all 0 output on bus 23 to a new output. That new output is the encoded representation for the four symbols "space, space, space, dash."

In response to the fourth LSRCH* pulse of the second set, flip-flop 594 is clocked with a 0 on its Q output so that gates 601 and 602 both have 0 outputs while gate 603 retains a 1 output. Accordingly, for the fourth LSRCH* pulse, the input to encoder 598 is 001 which corresponds to an all 0 code on bus 23.

In response to the fifth LSRCH* pulse of the second set, the Q output of flip-flop 594 is a 1 so that again an all 1 input appears on lines 599 to encoder 598. That input again corresponds to a "space, space, space, dash" code on lines 23.

In response to the sixth LSRCH* pulse of the second set, the Q output of flip-flop 594 returns to a 0 so that the input to encoder 598 is 001 and the output is all 0's.

In response to the seventh LSRCH* pulse of the second set, an all 1's input appears on lines 599 to encoder 598 and the coded output on bus 23 represents "space, space, space, dash."

Finally, in response to the eighth LSRCH* pulse of the second set, a 001 input appears on lines 599.

During the second set of LSRCH* pulses, all 0's were output on bus 23 in response to the first, second, fourth, sixth, and eighth LSRCH* pulses. A "space, space, space, dash" output appeared on bus 23 in response to the third, fifth and seventh LSRCH* pulses. Since only three "space, space, space, dash" codes appeared on the bus 23 (and four are required) the central processing unit 9 in FIG. 2 initiates a third set of eight LSRCH* pulses after the LEND* signal appearing at the termination of the second set.

The LEND signal occurring after the second set of pulses, functions to clock flip-flop 596 with a 0 on its output. That 0 output, however, has no effect on flip-flop 595 since flip-flop 595 at this time is held with a 1 on its Q output by its preset input.

During the third set of eight LSRCH* pulses, the ID generator 537 contunues to operate in the same manner that it did during the third through eight LSRCH* pulses of the second set. Specifically, lines 599 have an all input in response to the first, third, fifth, and seventh LSRCH* pulses of the third set. The lines 599 have a 001 input during the second, fourth, sixth and eight LSRCH* pulses of the third set. Accordingly, the ID generator 537, during the third set, generates four "space, space, space, dash" codes on bus 23 alternated by all 0 signals. The central processing unit 9 of FIG. 2, therefore, properly identifies the "space, space, space, dash" code four consecutive times and does not send out any additional LSRCH* pulses.

In FIG. 6, the reference data store 539 provides reference data to the reference comparator 536. The data store 539 includes a conventional read only memory 609 which is addressed by binary counter 609. Counter 609 is stepped on its clock input by the $\phi(OUT)^*$ signal unless held cleared on the CLR input or inhibited on the P input. Counter 609 provides a parallel output on outputs QA, QB, QC, and QD. Whenever counter 609 reaches its full count, it provides a signal on its carry output CRY. The carry output connects to a conventional edge-triggered flip-flop 614 which is clocked when the carry output goes from 1 to 0. The carry output goes from 1 to 0 during normal clocking in the data comparison sequence.

In FIG. 6, the read only memory 610 includes 32 8-bit words. The memory 610 is addressed by the 5-bit input ABCDE. The eight outputs for each addressed word appear as B0, B1, . . . , B7. The B4 output connects to the EXCLUSIVE-OR gate 611 which together with the AD1 signal functions to inhibit the stepping of counter 609 through the P input and to inhibit any output through NOR gate 618.

In FIG. 6, the flip-flop 608 is preset by operation of a 0 on the ABORT* line. Flip-flop 608 is clocked by the TRKCOM* signal and stores the level of the BUSY* line. When the data verifier is busy, the BUSY* line is 0 so that a 0 appears on the Q output of flip-flop 608. The 0 on the Q output is input to NOR gate 607. Gate 607 also receives the DUMPRO* and TRKCOM* signals. When the inputs to gate 607 are all 0's, the output is a 1 which removes the clear input from counter 609 and provides an enable input to gate 619 in the reference comparator 536.

For each count of counter 609, memory 610 is addressed and provides an 8-bit output word. Four bits of each output words are data which appear on outputs B0 through B3. The other four bits B4 through B7 are control bits for controlling the operation of the reference comparator 536 and the data store 539.

In FIG. 6, the reference comparator includes the EXCLUSIVE-OR gates 617 which compare the outputs from the memory 610 locations B0 through B3 with the four-bits from the MD bus. The control of the comparison by gates 617 is by the AND gates 615. The outputs from gates 615 tie respectively to the B0 through B3 outputs of memory 610 so that gates 615 can force the outputs from memory 610 to prdetermined levels. The other inputs to gates 615 are derived from the trunk counter address on the four-bit TC bus. Comparison of the data occurs in gates 617 which in turn have their outputs connected as inputs to NOR gate 618. Gate 618 when enabled by gate 611, provides an input to NOR gate 619. Gate 619 also has control inputs from memory 610 and from the NOR gate 607. If gate 619 receives a 0 from gate 618 at a time when its two other inputs are also 0, a 1 is provided on the D input of flip-flop 613. Flip-flop 613 is clocked by the φ(OUT)* signal to store the output level from gate 619. If the output from gate 619 is a 1, flip-flop 613 is clocked to provide a 0 on its Q* output. A 0 on the Q* output of flip-flop 613 signifies that an alarm should be sounded as indicated by a 0 for the MEMALM* signal.

The general operation of the FIG. 6 circuitry is to receive fifth different 4-bit words on the MD bus. The 50 words on the MD bus corresponds to the 50 characters that are output from the CPU memory 14 of the FIG. 2 to an I/O device 16. The reference comparator of FIG. 6 functions only to make a comparison for 32 of those 50 input characters on the MD bus. During the balance of the characters, that is 18 characters, the gate 611 provides an output connected to inhibit the counter 609 and the gate 618. During the 32 other characters, gate 611 provides a 1 output which enables counter 609 to be stepped and enables outputs to be transmitted through gate 618.

What is claimed is:

1. In a telephone system including station lines, trunk lines, and a switching exchange for connecting the station lines to the truck lines, the apparatus comprising,
   multiplex apparatus for detecting and transmitting usage information signifying station line usage of a trunk line, said multiplex apparatus including,
   a multiplex channel,
   means for addressing said trunk lines with a multiplexer trunk address to multiplex data for transmission over said channel,
   a plurality of receivers for connection to said trunk lines over said channel, each of said receivers including means to sample and analyze said data on said channel from a connection trunk line to produce usage information,
   means for addressing said receivers with a multiplexer receiver address to connect a receiver to a trunk line and thereby demultiplex said data from said channel,
   data verifier apparatus for verifying the operation of said multiplex apparatus, said data verifier apparatus including,
   test generator means for inserting test information into said channel for transmission over said channel,
   test reference store means for storing reference information corresponding to the test information inserted into said channel by said test generator means,
   test comparator means for comparing said test information demultiplexed from said channel with said reference information from said store means to verify the operation of the multiplexing system,
   control means for controlling said test generator means, said test reference store means and said test comparator means.

2. The apparatus of claim 1 wherein said control means includes test initiate circuit means for initiating operation of said data verifier apparatus to initiate a verification test.

3. The apparatus of claim 1 wherein said data verifier apparatus includes,
   trunk address means for specifying a verifier trunk address,
   address comparator means for comparing said multiplex trunk address and said verifier trunk address to produce a comparison signal,
   means for energizing said test generator means in response to said comparision signal.

4. The apparatus of claim 3 including a receiver address comparator for comparing said verifier trunk address with said multiplexer receiver address for signaling when said data verifier apparatus and said receiver are at the same address.

5. The apparatus of claim 1 including means for changing said receiver address relative to said multiplexer trunk address whereby trunk lines are connected to different receivers.

6. In a telephone system including station lines, trunk lines and a switching exchange for connecting the station lines to the trunk lines, the apparatus comprising,
   multiplex apparatus for detecting and transmitting usage information signifying station line usage of a trunk line, said multiplex apparatus including,
   a multiplex channel, means for addressing said trunk lines with a multiplexer trunk address to multiplex data onto said channel, a plurality of receivers for connection to said trunk lines over said channel, each of said receivers including means to sample and analyze data on said channel from a connected trunk line to produce usage information means for addressing said receivers with a multiplexer receiver address to connect a receiver to a truck line and thereby demultiplex data from said channel, data vertifier apparatus for verifying the operation of said multiplex apparatus, said data verifier apparatus including, test generator means for inserting test information into said channel, test reference store means for storing reference information corresponding to the test information inserted into said channel by said test generator means, test comparator means for comparing test information demultiplexed from said channel with said reference information from said store means to verify the operation of the multiplexing system, control means for controlling said test generator means, said test reference store means and said test comparator means wherein said control means include test initiate circuit means for initiating operation of said data verifier apparatus to initiate a verification test and means for storing busy signals for signaling the busy and non-busy states of said data verifier apparatus.

7. In a telephone system including station lines, trunk lines, and a switching exchange for connecting the station lines to the trunk lines, the apparatus comprising:

multiplex apparatus for detecting and transmitting usage information signifying station line usage of a trunk line, said multiplex apparatus including, a multiplex channel, means for addressing said trunk lines with a multiplexer trunk address to multiplex data for transmission over said channel, a plurality of receivers for connection to said trunk lines over said channel, each of said receivers including means to sample and analyze said data on said channel from a connected trunk line to produce usage information, means for addressing said receivers with a multiplexer receiver address to connect a receiver to a trunk line and thereby demultiplex said data from said channel, data verifier apparatus for verifying the operation of said multiplex apparatus, said data verifier apparatus including, test generator means for inserting test information into said channel for transmission over said channel, test reference store means for storing reference information corresponding to the test information inserted into said channel by said test generator means, test comparator means for comparing said test information demultiplexed from said channel with said reference information from said store means to verify the operation of the multiplexing system, control means for controlling said test generator means, said test reference store means and said test comparator means, said control means including sense busy circuitry means for detecting when said channel is busy transmitting usage information.

8. The apparatus of claim 7 wherein said sense busy circuitry means includes means for preventing a verification test when said channel is busy transmitting usage information.

9. In a telephone system including station lines, trunk lines and a switching exchange for connecting the station lines to the trunk lines, the apparatus comprising, multiplex apparatus for detecting and transmitting usage information signifying station line usage of a trunk line, said multiplex apparatus including, a multiplex channel, means for addressing said trunk lines with a multiplexer trunk address to multiplex data onto said channel, a plurality of receivers for connection to said trunk lines over said channel, each of said receivers including means to sample and analyze data on said channel from a connected trunk line to produce usage information means for addressing said receivers with a multiplexer receiver address to connect a receiver to a trunk line and thereby demultiplex data from said channel, data verifier apparatus for verifying the operation of said multiplex apparatus, said data verifier apparatus including, test generator means for inserting test information into said channel, test reference store means for storing reference information corresponding to the test information inserted into said channel by said test generator means, test comparator means for comparing test information demultiplexed from said channel with said reference information from said store means to verify the operation of the multiplexing system, control means for controlling said test generator means, said test reference store means and said test comparator means wherein said multiplex apparatus includes, sensing means for sensing the busy condition of a busy trunk line, generating means for generating an identification signal for transmission from said busy trunk line through the said exchange to one of said station lines connected to said busy trunk line, detector means connected to said station lines for detecting the presence of said identification signal on said one of said station lines to identify the station line connected to said busy trunk line, and wherein said data verifier apparatus includes, line identification generator means for generating a test identification signal for testing said detector means.

10. In a telephone system including station lines, trunk lines and a switching exchange for connecting the station lines to the trunk lines, the apparatus comprising, multiplex apparatus for detecting the transmitting usage information signifying station line usage of a trunk line, said multiplex apparatus including, a multiplex channel, means for addressing said trunk lines with a multiplexer trunk address to multiplex data onto said channel, a plurality of receivers for connection to said trunk lines over said channel, each of said receivers including means to sample and analyze data on said channel from a connected trunk line to produce usage information means for addressing said receivers with a multiplexer receiver address to connect a receiver to a trunk line and thereby demultiplex data from said channel, data verifier apparatus for verifying the operation of said multiplex apparatus, said data verifier apparatus including, test generator means for inserting test information into said channel, test reference store means for storing reference information corresponding to the test information inserted into said channel by said test generator means, test comparator means for comparing test information demultiplexed from said channel with said reference information from said store means to verify the operation of the multiplexing system, control means for controlling said test generator means, said test reference store means and said test comparator means, said apparatus including dial pulse detection apparatus for detecting dial pulse generator signals on trunk lines, said data verifier apparatus including dial pulse generator means for generating dial pulse test signals for testing said dial pulse detection apparatus.

11. The apparatus of claim 10 including dial pulse comparator means for comparing dial pulse signals detected by said dial pulse detection apparatus with said dial pulse test signals from said dial pulse generator means.

12. In a telephone system including station lines, trunk lines and a switching exchange for connecting the stationalines to the trunk lines, the apparatus comprising, multiplex apparatus for detecting and transmitting usage information signifying stationline usage of a trunk line, said multiplex apparatus including, a multiplex channel, means for addressing said trunk lines with a multiplexer trunk address to multiplex data onto said channel, a plurality of receivers for connection to said trunk lines over said channel, each of said receivers including means to sample and analyze data on said channel from a connected trunk line to produce usage information means for addressing said receivers with a multiplexer receiver address to connect a receiver to a trunk line and thereby demultiplex data from said channel, data verifier apparatus for verifying the operation of said multiplex apparatus, said data verifier apparatus including, test generator means for inserting test information into said channel, test reference store means for storing reference information corresponding to the test information inserted into said channel by said test generator means, test comparator means for comparing test information demultiplexed from said channel with said reference information from said store means to verify the operation of the multiplexing system, control means for controlling said test generator means, said test reference store means and said test comparator means, said apparatus including answer signal detection means for identifying when a call on a busy trunk line has been answered and where said data verifier apparatus includes answer signal generator means for generating an answer test signal for testing said answer signal detection means.

13. The apparatus of claim 12 including means for sensing whether said answer signal detection means detects said answer test signal within a predetermined time after generation by said answer signal generator means.

14. In a telephone system including a plurality of telephone lines the apparatus comprising:

multiplex apparatus for detecting and transmitting usage information signifying usage of a first one of said telephone lines, said multiplex apparatus including, a multiplex channel, means for addressing a first group of said telephone lines with a multiplexer address to multiplex data for transmission over said channel, a plurality of receivers for connection to said first group of lines over said channel, each of said receivers including means to sample and analyze said data on said channel from a connected one of said lines to produce usage information, means for addressing said receivers with a multiplexer receiver address to connect a receiver to one of said group of lines and thereby demultiplex said data from said channel, data verifier apparatus for verifying the operation of said multiplex apparatus, said data verifier apparatus including, test generator means for inserting test information into said channel for transmission over said channel, test reference store means for storing reference information corresponding to the test information inserted into said channel by said test generator means, test comparator means for comparing said test information demultiplexed from said channel with said reference information from said store means to verify the operation of the multiplexing system, and control means for controlling said test generator means, said test reference store means and said test comparator means.

15. In a telephone system including a plurality of telephone lines, the method comprising the steps of:

detecting and transmitting usage information in a multiplex apparatus having a common multiplex channel signifying usage of a first one of said telephone lines, addressing a first group of said telephone lines with a multiplexer address to multiplex data for transmission ove said channel, connecting a plurality of receivers to said first group of lines over said channel, sampling and analyzing said data on said channels from a connected one of said lines at said plurality of receivers to produce usage information, addressing said receivers with a multiplexer receiver address to connect a receiver to one of said group of lines and thereby demultiplex said data from said channel, vertifying the operation of said multiplex apparatus by generating test information, inserting said test information into said channel for transmission over said channel, detecting said transmitted information from said channel, accessing stored reference information corresponding to said test information from a reference store, and comparing said stored reference information and said test information detected from said channel to verify the operation of said multiplex apparatus.

* * * * *